United States Patent
Fornage

(10) Patent No.: US 7,796,412 B2
(45) Date of Patent: Sep. 14, 2010

(54) METHOD AND APPARATUS FOR CONVERTING DIRECT CURRENT TO ALTERNATING CURRENT

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 272 days.

(21) Appl. No.: 11/725,763

(22) Filed: Mar. 20, 2007

(65) Prior Publication Data

US 2007/0221267 A1 Sep. 27, 2007

Related U.S. Application Data

(60) Provisional application No. 60/743,713, filed on Mar. 23, 2006.

(51) Int. Cl.
H02M 3/24 (2006.01)

(52) U.S. Cl. .................................... 363/97; 323/906

(58) Field of Classification Search ............ 363/21.13, 363/97, 131; 323/906; 250/203.4
See application file for complete search history.

(56) References Cited

U.S. PATENT DOCUMENTS

| | | | |
|---|---|---|---|
| 4,404,472 A | 9/1983 | Steigerwald | |
| 4,626,983 A | 12/1986 | Harada et al. | |
| 4,870,553 A | 9/1989 | Brown | |
| 5,268,832 A | 12/1993 | Kandatsu | |
| 5,430,635 A | 7/1995 | Liu | |
| 5,508,903 A * | 4/1996 | Alexndrov | 363/16 |
| 5,886,890 A | 3/1999 | Ishida et al. | |
| 5,898,585 A | 4/1999 | Sirichote et al. | |
| 6,031,736 A | 2/2000 | Takehara et al. | |
| 6,046,919 A | 4/2000 | Madenokouji et al. | |
| 6,201,180 B1 | 3/2001 | Meyer et al. | |
| 6,255,804 B1 * | 7/2001 | Herniter et al. | 320/137 |
| 6,301,129 B1 | 10/2001 | Yasumura | |
| 6,678,176 B2 | 1/2004 | Lumsden | |
| 6,809,942 B2 | 10/2004 | Madenokouji et al. | |
| 7,675,759 B2 * | 3/2010 | Artusi et al. | 363/21.01 |
| 2005/0036345 A1 | 2/2005 | Lin et al. | |
| 2006/0062034 A1 | 3/2006 | Mazumder et al. | |

OTHER PUBLICATIONS

Burra, R., et al., "A Low-Cost Fuel-Cell (FC) Power Electronic System (PES) for Residential Loads," 0-7803-8458-X/04, © 2004, IEEE, pp. 468-473.

Basso, Christophe, A 30 W Power Supply Operating in Quasi-Square Wave Resonant Mode, ON Semiconductor, Publication Order No. AND8129/D, Oct. 2003—Rev. 0.

"PID Controller," downloaded from eCircuit Center web site, http://www.ecircuitcenter.com/Circuits/pid1/pid1.htm, on Mar. 6, 2007, pp. 1-6.

Kern, G., "SunSine™ 300: Manufacture of an AC Photovoltaic Module," Final Report, Phases I & II, Jul. 25, 1995—Jun. 30, 1998, National Renewable Energy Laboratory (NREL), NREL/SR-520-26085, Mar. 1999.

(Continued)

Primary Examiner—Shawn Riley
(74) Attorney, Agent, or Firm—Moser IP Law Group

(57) ABSTRACT

A method and apparatus for converting Direct Current (DC) to Alternating Current (AC). The method comprises performing system analysis on at least one of a DC current, DC voltage, or an AC voltage; utilizing the system analysis for selecting at least one conversion parameter; and converting DC to AC utilizing the at least one conversion parameter.

18 Claims, 7 Drawing Sheets

OTHER PUBLICATIONS

Saha, S., et al., "Novel grid-connected photovoltaic inverter," *IEE Proc.-Gener. Transm. Distrib.*, vol. 143, No. 2, Mar. 1996, pp. 219-224.

UL-1741 ed. 1, "Standard for Inverters, Converters, Controllers and Interconnection System Equipment for Use with Distributed Energy Resources," May 1999, downloaded from http://ulstandardsinfonet.ul.com/scopes/1741.html on Jun. 6, 2007.

International Search Report and Written Opinion mailed Sep. 4, 2007 for PCT Application No. PCT/US2007/006841.

International Preliminary Report on Patentability mailed Oct. 2, 2008 for PCT Application No. PCT/US2007/006841.

* cited by examiner

METHOD AND APPARATUS FOR CONVERTING DIRECT CURRENT TO ALTERNATING CURRENT

CROSS-REFERENCE TO RELATED APPLICATIONS

The present invention claims benefit of U.S. provisional patent application Ser. No. 60/743,713, filed on Mar. 23, 2006, which is herein incorporated by reference.

BACKGROUND OF THE INVENTION

1. Field of the Invention

The present invention relates generally to inverters that convert Direct Current (DC) to Alternating Current (AC). More particularly, the present invention relates to a micro-inverter that dynamically selects conversion parameters for converting DC to AC.

2. Description of the Related Art

Historically, solar panels have been used mostly in remote applications where commercial power was not available. This was due to the high cost of an installation making it an economical choice only when nothing else was available. However, it is now well established that the fossil energy reserves, which are currently used to generate electricity, are being rapidly depleted. The worldwide growth of power demand is leading to a durable increase in energy cost. Short of the development of a clean nuclear fusion process, there is no foreseeable end to such trend.

Photovoltaic generation systems require an inverter that converts Direct Current (DC) from solar cells to Alternating Current (AC) for use by household appliances, for example. It is important for any power generation system to produce and deliver electricity to electric appliances in the most efficient manner. A typical photovoltaic array comprises a plurality of sub-arrays, where each sub-array comprises coupled individual solar panels. A junction box combines the output of the various sub-arrays to form a DC signal that is supplied to an inverter. The inverter converts the DC to AC and supplies the AC to the power grid. The user uses power from the grid in a typical fashion; however, their cost of electricity from the grid is offset by the amount of electricity the photovoltaic generation system supplies to the grid.

In such a system, the amount of power that is efficiently coupled to the grid is important for the cost recovery of the system. As such, the inverter must be as efficient as possible.

To enhance the overall efficiency, present technology uses "micro-inverters", such that each solar panel is coupled to an individual inverter. The AC outputs of the micro-inverters are combined and coupled to the power grid. Although the use of micro-inverters is more efficient than a single inverter, the efficiency of each individual micro-inverter is typically 90% or less.

Therefore, there is a need for a method and apparatus for efficiently converting DC to AC.

SUMMARY OF THE INVENTION

In one embodiment, the present invention discloses a method and apparatus for converting DC to AC. The method comprises performing system analysis on at least one of a DC current, DC voltage, and an AC voltage, utilizing the result of the analysis for selecting at least one conversion flyback mode; and converting DC to AC utilizing the at least one conversion flyback mode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
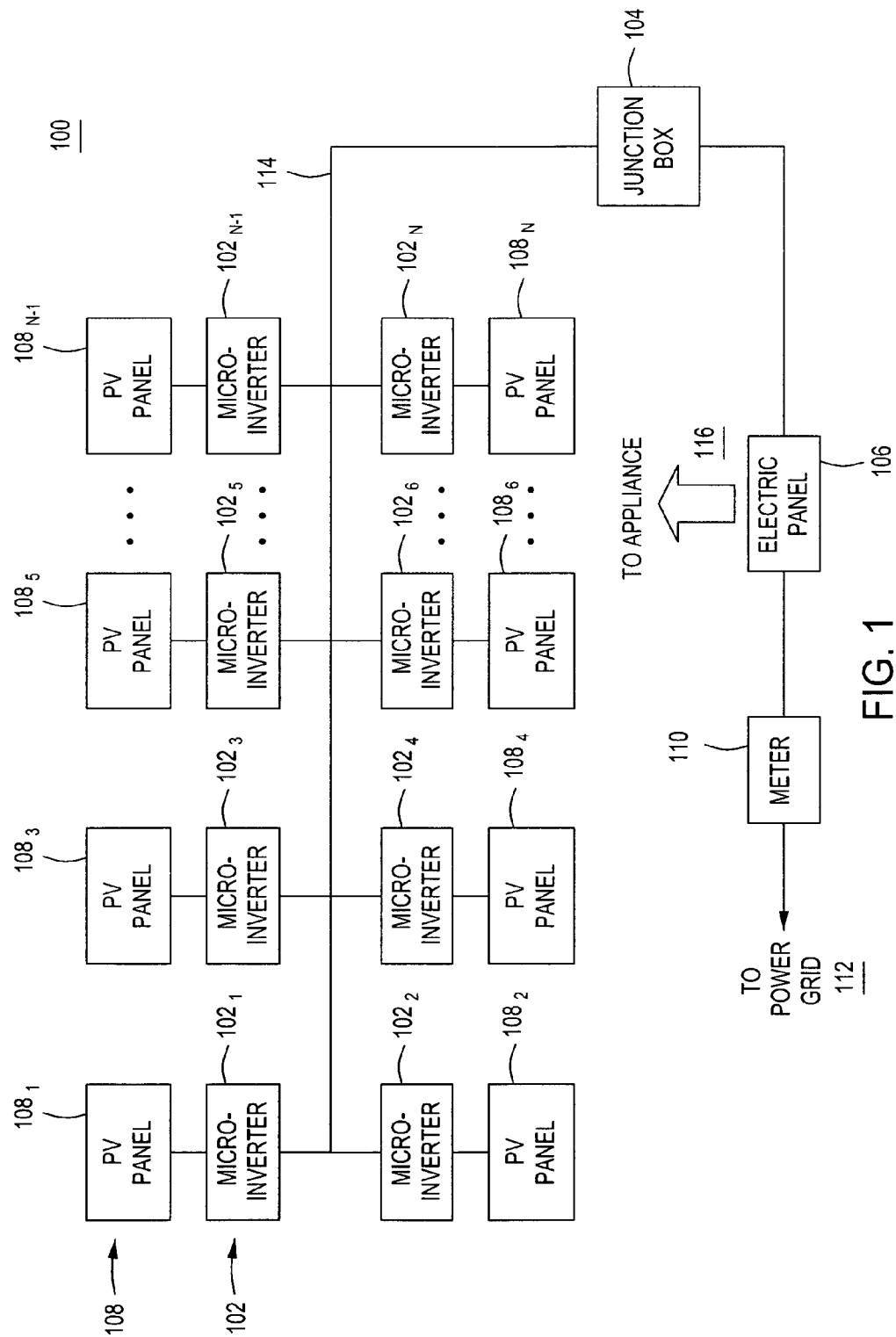
FIG. 1 is a block diagram of an exemplary power generation system that utilizes one embodiment of the present invention.

FIG. 1 is a block diagram of an exemplary power generation system 100 that utilizes one embodiment of the present invention. This diagram only portrays one variation of the myriad of possible system configurations. The present invention can function in a variety of environments and systems.

The power generation system 100 comprises a plurality of micro-inverters $102_1$, $102_2$ ... $102_n$, a junction box 104, an electric panel 106, a plurality of photovoltaic panels $108_1$, $108_2$ ... $108_n$, and an electric meter 110. The system 100 supplies power to a power grid 112, appliances 116, or both. The plurality of photovoltaic panels $108_1$, $108_2$ ... $108_n$ are well known in the art and are used for generating DC power from solar energy. The plurality of photovoltaic panels $108_1$, $108_2$ ... $108_n$ (also referred to herein as solar panels) may be of any size or shape. Even though the system 100 shows eight (8) photovoltaic panels $108_1$, $108_2$ ... $108_n$, the system 100 may include any number of the photovoltaic panels 108.

Each photovoltaic panel $108_1$, $108_2$ ... $108_n$ is coupled to a micro-inverter $102_1$, $102_2$ ... $102_n$. The micro-inverter $102_1$, $102_2$ ... $102_n$ converts DC power generated by the plurality of photovoltaic panels $108_1$, $108_2$ ... $108_n$ into AC power. The micro-inverters of the present invention meter out current that is in-phase with the AC grid current and generate such current with low distortion.

The micro-inverters $102_1$, $102_2$ ... $102_n$ couple the output AC to an AC bus 114. The AC bus 114 is terminated into a junction box 104. Using such an AC bus 114 and individual inverters, the system 100 is scalable and flexible to fit any user's needs. The structure and function of the micro-inverters $102_1$, $102_2$ ... $102_n$ are discussed below.

The junction box 104 generally connects together the outputs from all the micro-inverters $102_1$, $102_2$ ... $102_n$ to form a single AC feed to the electric panel 106.

The electric panel 106 connects the power from the junction box 104 to the power grid 112 and, in some applications, to appliances 116 within a users facility. For example, in a home, the electric panel 106 is a well-known AC distribution hub comprising various circuit breakers and/or fuses to distribute electricity to various circuits within the home. The electric panel 106 is coupled through the electric meter 110 to the power grid 112. The meter 110 determines the amount of power supplied to the grid, such that the owner of the system 100 can be compensated for supplying electricity.

Figure 2:
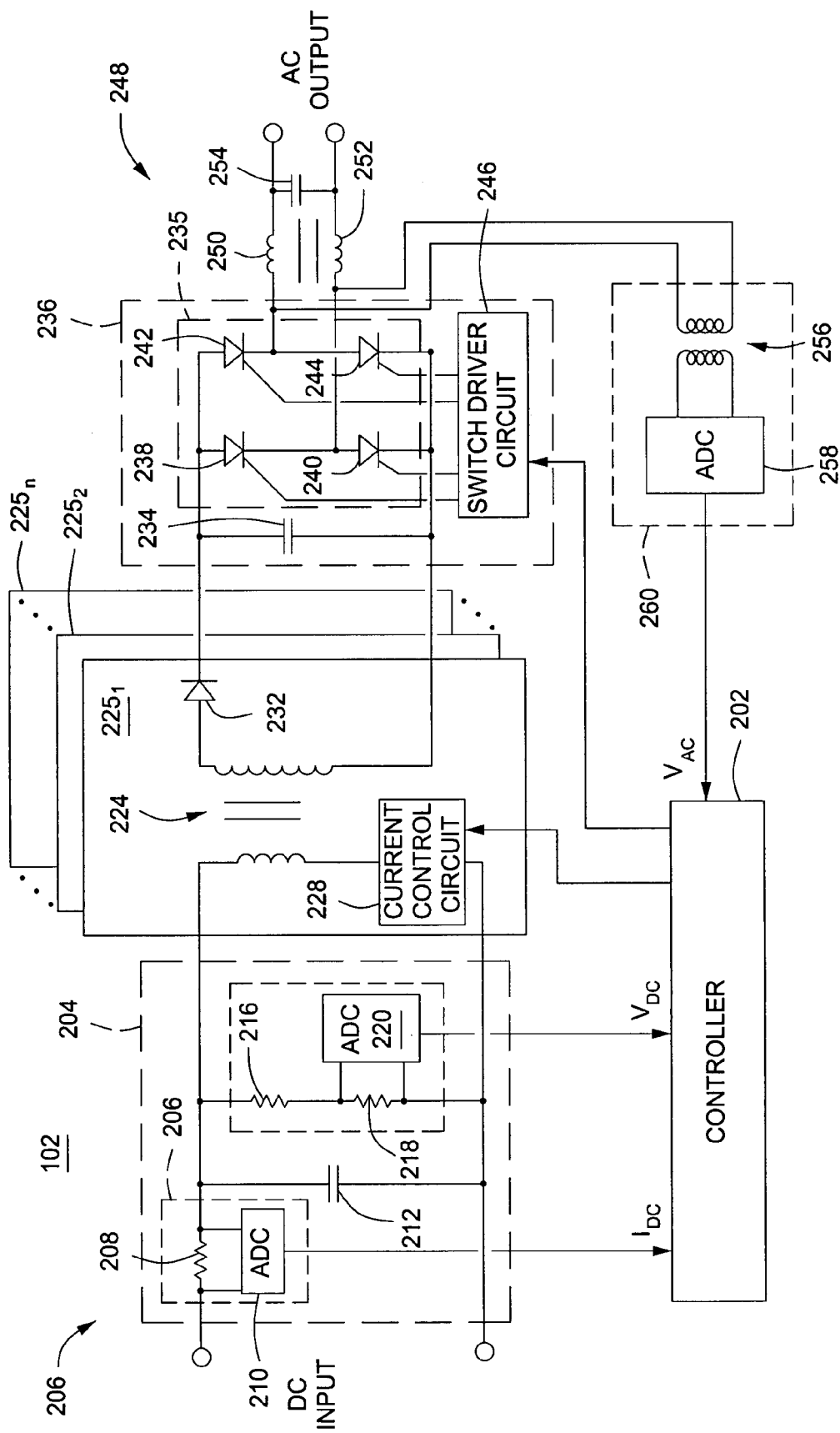
FIG. 2 is a detailed schematic diagram of an exemplary micro-inverter of FIG. 1.

FIG. 2 is a detailed schematic diagram of an exemplary embodiment of the micro-inverter of FIG. 1. The micro-inverter 102 comprises a power conversion circuit 200 and a controller 202. The power conversion circuit 200 comprises an input circuit 204 (also referred to as the DC circuit), at least one power stages $225_1, 225_2 \ldots 225_n$, an output circuit 236 (also referred to as the AC circuit), an output filter circuit 248, and an AC voltage sampler 260. The power stage 225 is coupled between the input circuit 204 and the output circuit 236.

The power conversion circuit 200 is controlled by controller 202 to efficiently convert the DC to AC. To optimize the efficiency, the controller 202 selects various flyback modes of operation for the power conversion circuit 200 depending upon the present state of the DC input voltage, DC input current and AC output voltage. As such, in one embodiment, the power conversion circuit 200 switches amongst a regular flyback mode, an interleaved mode, a quasi-resonant mode, or combinations thereof, where regular flyback mode is used during a low output voltage and current state, interleaved flyback mode is used during a high output current state, and quasi-resonant interleaved flyback mode is used during a high output voltage state. At a high current, high voltage state, an interleaved, quasi-resonant mode may also be used. These mode changes actively occur during each switching cycle of the power conversion circuit 200 to optimally convert DC power to AC power.

The input circuit 204 is coupled to one or more power stages $225_1, 225_2$ and will utilize one or more of the stages depending whether the conversion circuit 200 is operating in an interleaved flyback mode. In some embodiments of the invention, only one power stage is used and an interleaved flyback mode is unavailable. The input circuit 204 accepts DC input, for example, DC input generated by at least one photovoltaic panel. The input circuit 204 comprises a DC current sampler 206, an input capacitor 212, and a DC voltage sampler 214.

The ripple voltage across the input capacitor 212 has the form of a sine wave at double the line frequency and has a voltage excursion that equals the output voltage of the solar panel. By integrating the power (V×I) generated by the panel across both halves of the cycle, the controller 202 can determine an optimal operating voltage for the panel, i.e., control the output current of the inverter to maintain an optimal load for the panel.

To facilitate using the panel power as a control metric, the controller 202 comprises a DC voltage sampler 214 and a DC current sampler 206. The DC current sampler 206 comprises a sampling resistor 208 and an A/D Converter (ADC) 210, which may be coupled in parallel to the resistor 208. The ADC 210 generates digital samples that represent the DC current. The samples are coupled to the controller 202. One terminal of the sampling resistor 208 is coupled to the DC input and the other terminal is coupled to the input capacitor 212 and the DC voltage sampler 214. The terminal of the input capacitor 212 is coupled to the DC input.

The DC voltage sampler 214 comprises a voltage divider circuit 222 comprising two (2) serially connected resistors 216 and 218 (forming a voltage divider) and an ADC 220. One terminal of the resistor 216 is coupled to the filter capacitor 212 and the resistor 206. The second terminal of the resistor 216 is coupled to the resistor 218. The resistor 218 is coupled in parallel to the ADC 220. The second terminal of the resistor 218 is coupled to the filter capacitor 218. The ADC 220 outputs DC voltage samples from the DC voltage sampler 214 to the controller 202.

The power stages $225_1, 225_2 \ldots 225_n$ are connected to one another in parallel. Each stage 225 comprises a transformer 224, a diode 232, and a current control circuit 228. Each power stage 225 performs a DC to DC conversion and generates a positive rectified sinewave. This rectified sinewave is unfurled by the output circuit 236 to form a true AC waveform. The primary winding (coil) of the transformer 224 is coupled to the input circuit 204 and the secondary winding (coil) of the transformer 224 is coupled through the diode 232 to the output circuit 236. The current control circuit 228 controls the DC voltage that is applied to the primary coil in accordance with signals generated by the controller 202. Each stage 225 is independently utilized such that the stages can be interleaved and share the current load for the micro-inverter 102. Selection of a stage is performed by activating the control circuit 228 of a selected stage. The transformer 224 creates a "stepped up" voltage that is proportional to the windings ratio $N_s/N_p$, where $N_p$ is the number of windings in the primary coil and $N_s$ is the number of windings in the secondary coil. In one embodiment, the voltage is increased four fold across the transformer 224. The secondary voltage is applied to the diode 232 to produce a rectified sine wave at the output of each power stage 225. The conversion process of all the stages 225 is controlled by the current control circuit 228 of each stage, which is described in detail with respect to FIG. 7 below.

The secondary coil of the transformer 224 couples in parallel to the output circuit 236. The output circuit 236 comprises a filter capacitor 234 and a switch circuit 235. The capacitor 234 removes certain spurious AC signals from the output signal. The energy at the output of the secondary winding may be pulsatile in nature. The capacitor 234 averages each cycle to form a smooth AC waveform. The switch circuit 235 selectively applies the rectified sine wave to either "line" or "neutral", the AC output terminals. The switching of the switch circuit 235 is controlled by the controller 202 to maintain phase synchronicity with the line voltage.

The switch circuit 235 comprises a plurality of electronic switches. In one embodiment, the circuit 235 comprises four (4) silicon-controlled rectifiers (SCR) 238, 240, 242 and 244 (e.g., thyristors or triacs). In other embodiments, the SCR's may be replaced with other electronic switches, such as, insulated gate bipolar transistor (IGBT), bipolar junction transistor (BJT), MOSFET, gate turnoff thyristor (GTO) and the like. The SCR's 238, 240, 242 and 244 output is controlled by the switch driver circuit 246. The cathode terminal SCR 238 is coupled to the anode of diode 232 and the filter capacitor 234. The anode terminal of the SCR 238 is coupled to the SCR 240. The control terminal of the SCR 238 is coupled to the switch driver circuit 246. The cathode terminal of the SCR 240 is coupled to the SCR 238 and the anode terminal of the SCR 240 is coupled to the filter capacitor 234 and the transformer 224. The control terminal of the SCR 240 is coupled to the controller driver circuit 246, which may perform galvanic insulation by using photocouplers, pulse transformers or the like to isolate the output circuit 236 from the controller 202. The cathode terminal of the SCR 242 is coupled to the SCR 238 and the anode terminal is coupled to the SCR 244. The cathode terminal of the SCR 244 is coupled to the SCR 242 and the anode terminal is coupled to the SCR 240. The control terminals of both the SCR's 242 and 244 are coupled to the switch driver circuit 246. The switching of the SCRs is timed to ensure that the AC voltage is synchronously applied to the output terminals to match the phase of the grid voltage.

The secondary coil of the transformer 224 couples in parallel to the output circuit 236. The output circuit 236 comprises a filter capacitor 234 and a switch circuit 235. The capacitor 234 removes certain spurious AC signals from the output signal. The energy at the output of the secondary winding may be pulsatile in nature. The capacitor 234 averages each cycle to form a smooth AC waveform. The switch circuit 235 selectively applies the rectified sine wave to either "line" or "neutral", the AC output terminals. The switching of the switch circuit 235 is controlled by the controller 202 to maintain phase synchronicity with the line voltage.

The switch circuit 235 comprises a plurality of electronic switches. In one embodiment, the circuit 235 comprises four (4) silicon-controlled rectifiers (SCR) 238, 240, 242 and 244 (e.g., thyristors or triacs). In other embodiments, the SCR's may be replaced with other electronic switches, such as, insulated gate bipolar transistor (IGBT), bipolar junction transistor (BJT), MOSFET, gate turnoff thyristor (GTO) and the like. The SCR's 238, 240, 242 and 244 output is controlled by the switch driver circuit 246. The cathode terminal SCR 238 is coupled to the anode of diode 232 and the filter capacitor 234. The anode terminal of the SCR 238 is coupled to the SCR 240. The control terminal of the SCR 238 is coupled to the switch driver circuit 246. The cathode terminal of the SCR 240 is coupled to the SCR 238 and the anode terminal of the SCR 240 is coupled to the filter capacitor 234 and the transformer 224. The control terminal of the SCR 240 is coupled to the controller driver circuit 246, which may perform galvanic insulation by using photocouplers, pulse transformers or the like to isolate the output circuit 236 from the controller 202. The cathode terminal of the SCR 242 is coupled to the SCR 238 and the anode terminal is coupled to the SCR 244. The cathode terminal of the SCR 244 is coupled to the SCR 242 and the anode terminal is coupled to the SCR 240. The control terminals of both the SCR's 242 and 244 are coupled to the switch driver circuit 246. The switching of the SCRs is timed to ensure that the AC voltage is synchronously applied to the output terminals to match the phase of the grid voltage.

The power conversion circuit 200 converts DC to AC in accordance with the control and switching signals produced by the controller 202. As shall be described below, the controller 202 produces the control and switching signals in response to the samples of the DC and AC signals. Consequently, the power conversion circuit 200 may be optimally controlled to utilize a particular mode of operation to correspond to the present state of the DC and AC signals, i.e., to optimally match the AC output to the phase of the power grid such that the AC power is efficiently coupled to the power grid.

The controller 202 causes the power conversion circuit 200 to switch amongst various modes: simple flyback, quasi-resonant flyback, interleaved flyback and combinations thereof. The task of the controller 202 is to (1) control the power conversion circuit to have effective Maximum Power Point Tracking (MPPT), which alternatively may be performed by another circuit; (2) estimate the phase, voltage and frequency of the AC voltage; (3) accommodate unexpected behaviors such as over-current in the power stage; and (4) report to the end user data such as statistics on AC power generated by the micro-inverter.

The power conversion circuit 200 converts DC to AC in accordance with the control and switching signals produced by the controller 202. As shall be described below, the controller 202 produces the control and switching signals in response to the samples of the DC and AC signals. Consequently, the power conversion circuit 200 may be optimally controlled to utilize a particular mode of operation to correspond to the present state of the DC and AC signals, i.e., to optimally match the AC output to the phase of the power grid such that the AC power is efficiently coupled to the power grid.

Figure 3:
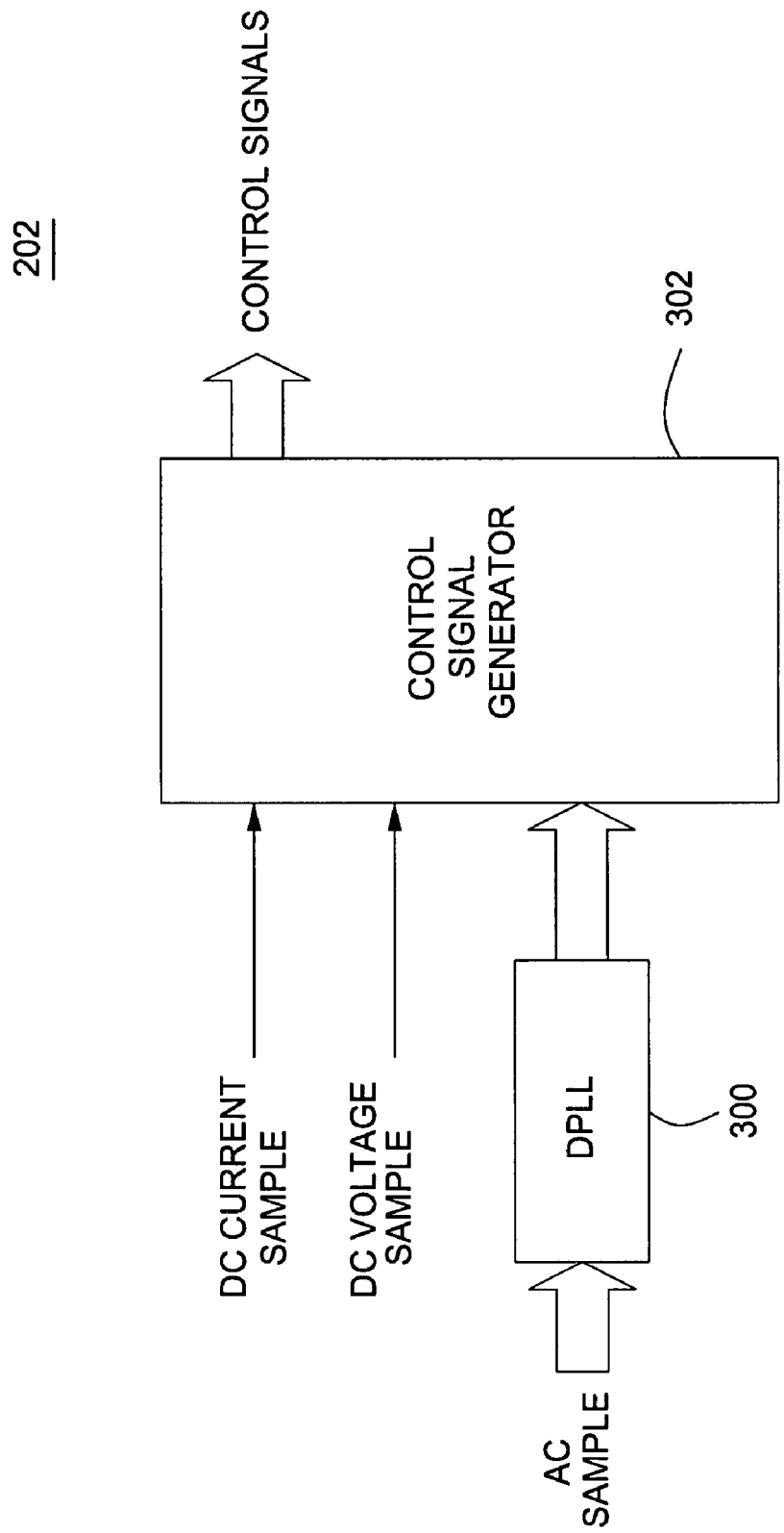
FIG. 3 is a block diagram of an exemplary embodiment of the controller of FIG. 2.
Figure 4:
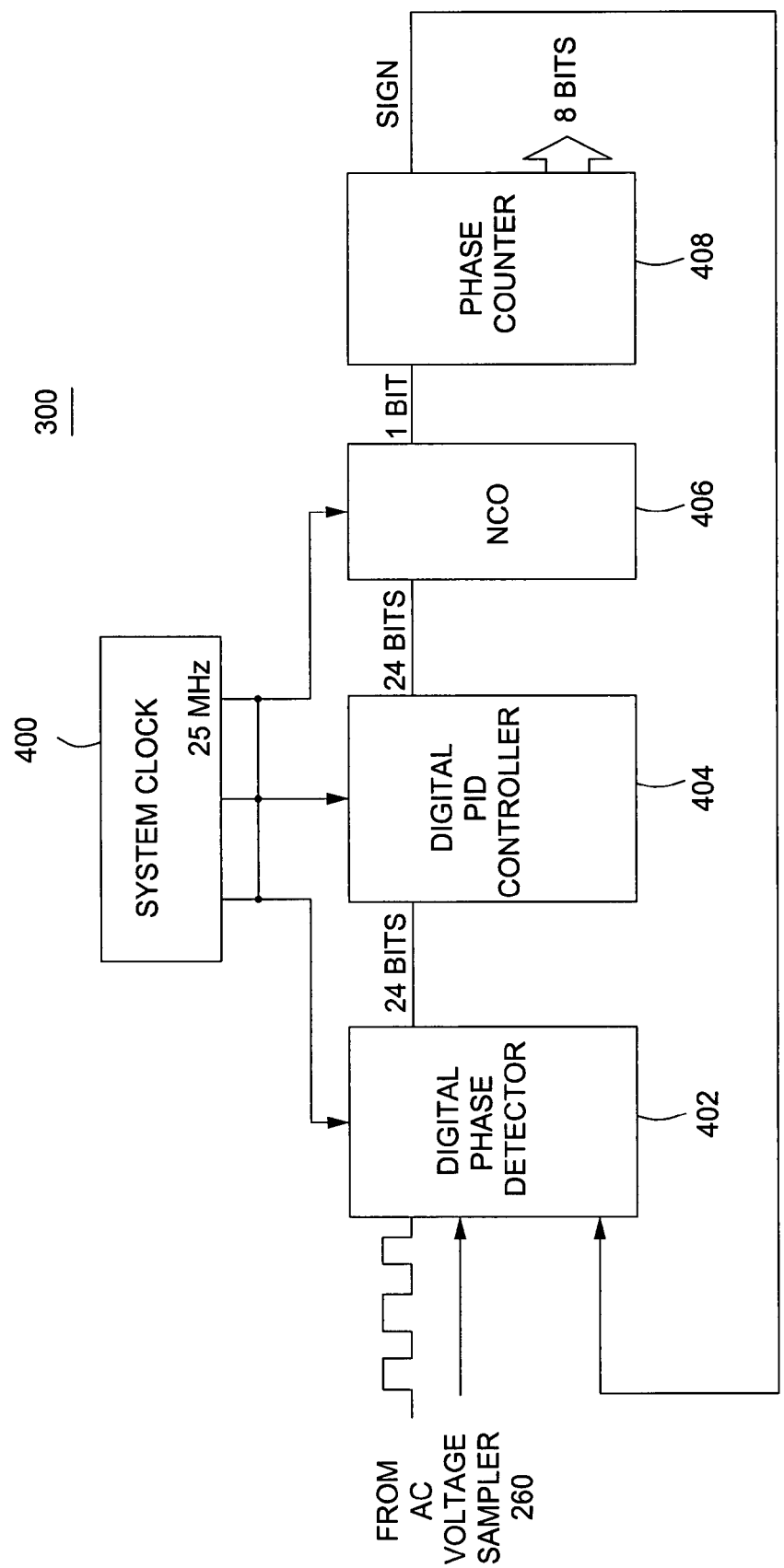
FIG. 4 is a block diagram of an exemplary embodiment of the digital phase lock loop of FIG. 3.

FIG. 4 is a detailed block diagram of an exemplary embodiment of the DPLL 300 FIG. 3. The DPLL 300 comprises a digital phase detector 402, a digital PID (Proportional, Integral Derivative) controller 404, a numerically controlled oscillator (NCO) 416, a phase counter 408 and a system clock 400.

FIG. 3 is a high level block diagram of the controller 202 comprising a digital phase lock loop (DPLL) 300 and a control signal generator 302. The DPLL 300 phase locks an oscillator to the AC voltage samples to produce a digital signal (e.g., an 8-bit signal) that is representative of the phase of the input signal. The phase signal is coupled to the control signal generator 302. The generator 302 uses the DC current, DC voltage and phase information to produce control signals for the current control circuit 228 and the switch 235 of FIG. 2.

Figure 5:
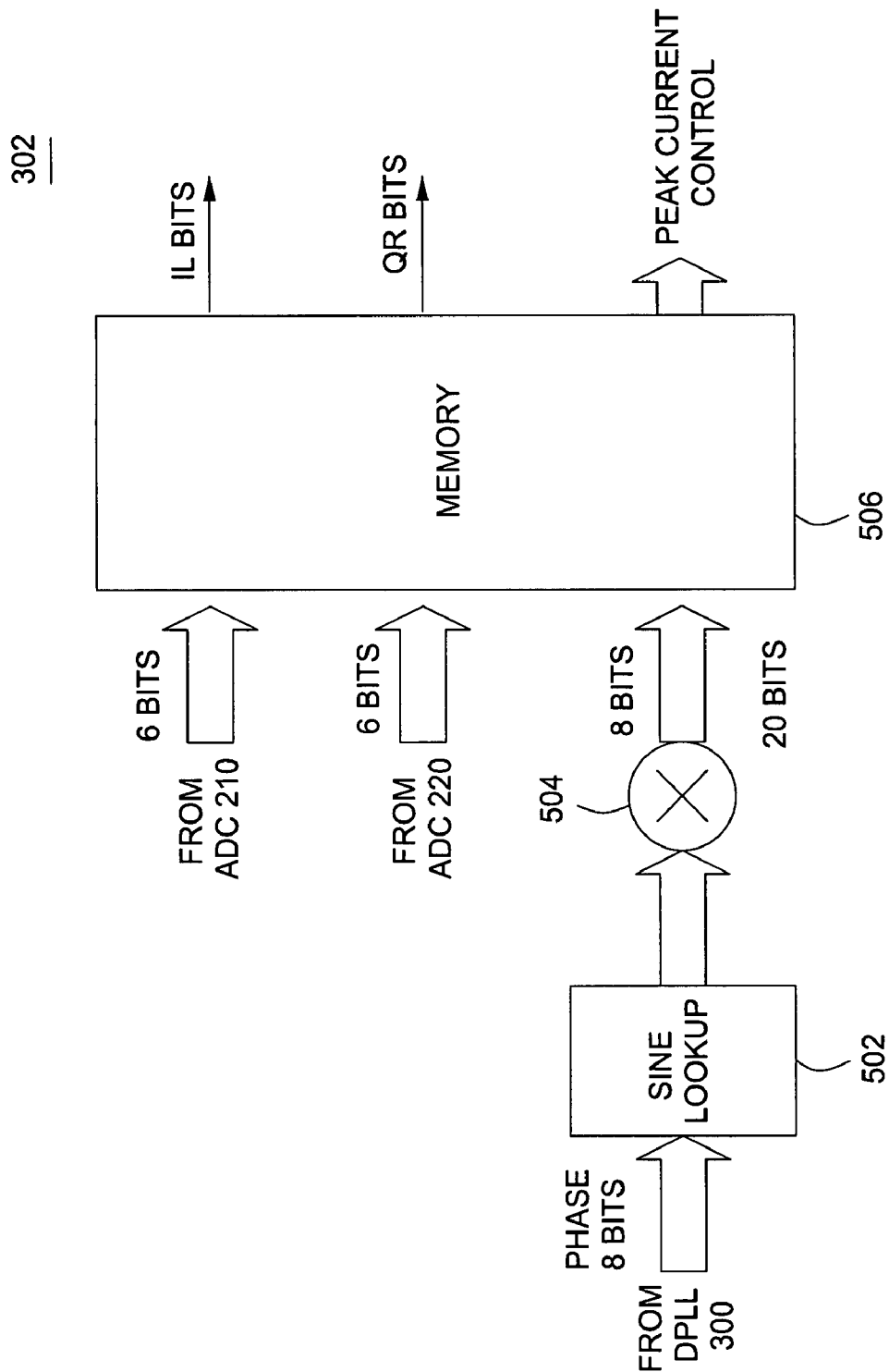
FIG. 5 is a detailed block diagram of an exemplary embodiment of the control signal generator.

FIG. 5 is a detailed block diagram of an exemplary embodiment of the control signal generator 302 (see FIG. 3). The control signal generator 302 comprises a sine lookup table 502, a multiplier 504 and a memory 506. The sine lookup table 502 receives the phase signal produced by the DPLL 300 and generates a sinusoidal signal in accordance with the phase signal. In essence, this table 502 creates a waveform that is phase locked to the power grid voltage. Thus, the sine lookup table assists in generating a low distortion current on the grid, regardless of the actual voltage waveform. The multiplier 504 multiplies the waveform with the required output current. The result is a scaled digital signal representing a required output current. This signal is coupled to the memory 506 as an address.

The memory 506 is any type of computer readable memory. The memory 506 may comprise random access memory or read only memory. The memory 506 receives the signals generated by the ADC 210 and ADC 220 (e.g., 6-bit signals) in addition to the 8-bit sinusoidal signal. As such, a 20-bit word is used to address the memory. The memory 506 receives the address inputs and outputs an inverter mode and phase signal settings, such as, Interleaved (IL) bit, a quasi-resonant (QR) bit, and peak current control bits. These signals are used to control the power conversion circuit 200.

In the depicted embodiment of the control signal generator, the memory 506 is used as a lookup table that is sequenced by the 20 bit address. As such, the present values of DC current, DC voltage and AC phase are used to select the control signals to facilitate operation of the inverter in a particular mode. The memory 506 is preloaded with a table that represents the control signals to be generated for various combinations of DC current, DC voltage, and AC phase. Although a memory is used in this embodiment, those skilled in the art will realize that a microprocessor or microcontroller may also be used to generate the control signals in view of the DC current, DC voltage and AC phase.

Figure 6:
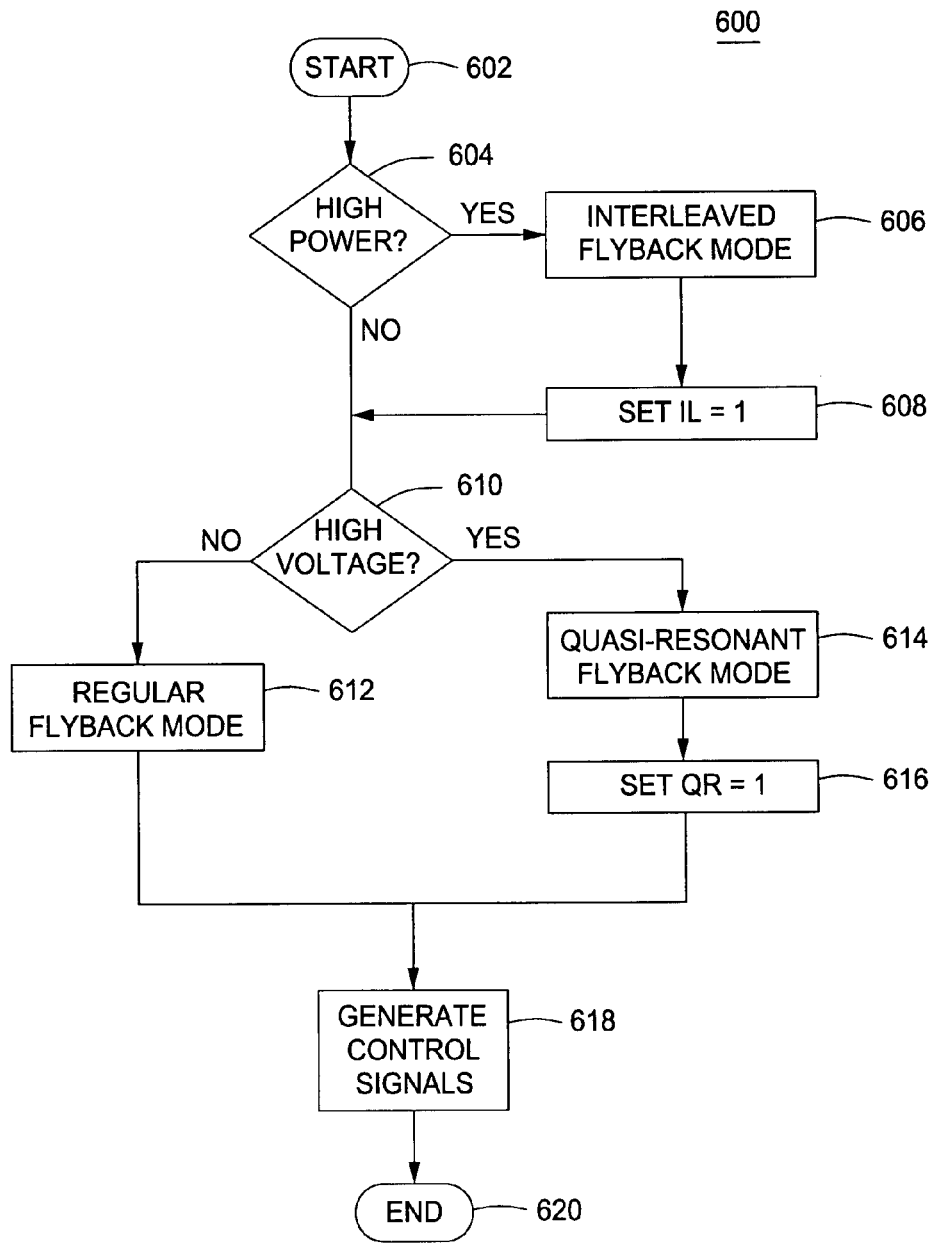
FIG. 6 is a flow diagram depicting an exemplary embodiment of a method 600 of operation of a micro-inverter of the present invention.

FIG. 6 is a flow diagram depicting an exemplary embodiment of a method 600 of operation of a micro-inverter of the present invention. This method 600 is performed at each sequence step, e.g., for each clock transition. As such, during a given AC cycle the inverter may utilize different modes of operation during the cycle.

The method 600 starts at step 602 and proceeds to step 604. At step 604, the method 600 performs calculations and checks if the input power is greater than a power threshold. To compute the input power, the DC voltage sample is multiplied by the DC current sample. If the operating power is greater than the power threshold, the method 600 proceeds to step 606, wherein the mode is an interleaved flyback mode. The interleaved flyback mode selects additional power stages to be used to share the power conversion requirements of the system. The threshold is set to ensure that additional stages are used if the input power level exceeds the safe level of a single power stage. Additional stages can be used in proportion to the amount of power. If additional stages are necessary, at step 608, the interleaved mode bit is set (IL=1). In other embodiments, the micro-inverter may not utilize an interleaved flyback mode, i.e., only one power stage is present. In such embodiments, steps 604, 606 and 608 are not used.

In the embodiment which uses a memory as a lookup table, the values of current and voltage representing a "high" power level are used to address a table entry that outputs IL=1, otherwise IL=0 for "low" power levels. An embodiment using a microprocessor would implement the flow diagram as a functional if, then, else statement.

At step 610, the method 600 queries whether the DC output voltage is sufficient to warrant using a quasi-resonant flyback mode for the power conversion circuit 200. If the query is negatively answered, the method 600 switches to, or remains in, a regular flyback mode. If, however, the DC input voltage is sufficient to have an affirmative answer to the query of step 610, the method 600 proceeds to step 614 wherein a quasi-resonant flyback mode is selected. Note that a combination mode of either interleaved, quasi-resonant flyback mode or interleaved, regular flyback mode is also selectable. At step 616, a quasi-resonant bit (QR=1) is set. At step 618, the current signal and the mode selection bits are created. The method ends at step 620.

Figure 7:
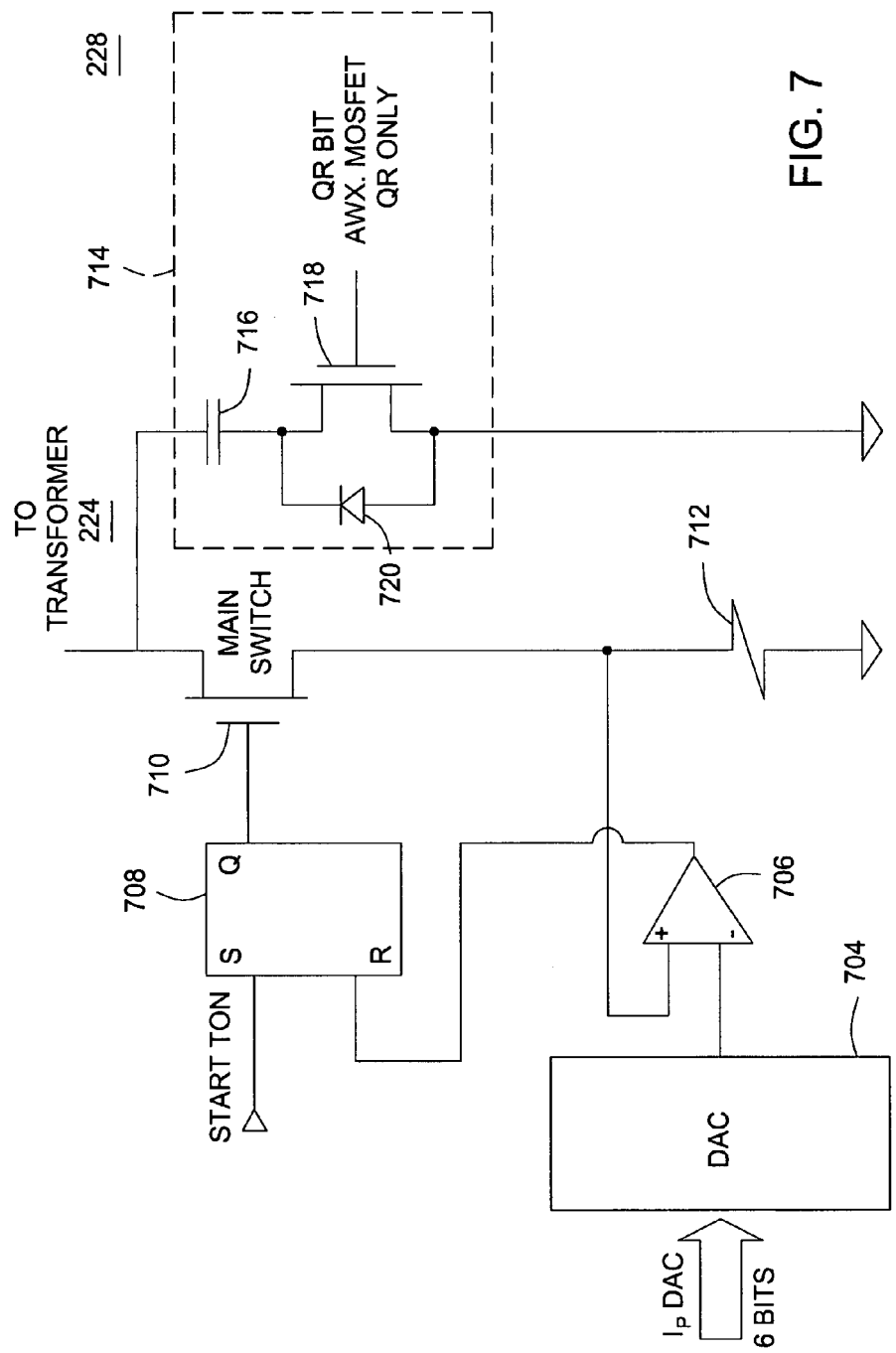
FIG. 7 is a detailed schematic diagram of an exemplary embodiment of the current control circuit.

FIG. 7 is a detailed schematic diagram of an exemplary embodiment of the current control circuit 228 (FIG. 2). The circuit 228 comprises a digital-to-analog converter (DAC) 704, a comparator 706, a flip-flop 708, a switch 710, a resistor 712, and an auxiliary quasi-resonant (QR) mode circuit 714. The peak current control signal generated by the memory 506 is coupled to the DAC 704. The DAC 704 converts the digital signal into an analog signal that is coupled to the negative input of the comparator 706. One terminal of the bias resistor 712 couples with the positive input of the comparator 706 and the drain of the switch 710. The switch 710 may be a MOSFET, BJT, IGBT or any other form of switch known in the art. The other terminal of the resistor 712 is grounded. As such, the comparator 706 operates as a switch depending on the level of the current control signal relative to the signal at the bias resistor 712. The relative state of the two signals resets the SR flip-flop 708.

The flip-flip 708 has two (2) inputs, "R" and "S", and one (1) output, "Q". The output of the op-amp 706 is coupled to the "R" input of the flip-flop 708. The Start Ton signal, which may also be the power transfer cycle start, is coupled to the "S" input of the flip-flop 708. The "Q" output drives the gate of the switch 710.

The auxiliary QR circuit 714 is triggered by the switch 718 when the mode is a quasi-resonant. The auxiliary QR circuit 714 comprises a capacitor 716, a diode 720, and an auxiliary power switch 718 (MOSFET). The circuit 714 switches a capacitor 716 across the main switch 710 to facilitate quasi-resonant operation of the circuit. The first terminal of the capacitor 716 couples to the source terminal of the main switch 710. The second terminal of the capacitor 716 couples to the source terminal of the switch 718. The drain terminal of the switch 718 is coupled to ground. The diode 720 is connected across the drain and source terminals. The gate of the switch 718 is controlled by the QR bit from memory 506.

When operating in a flyback mode, at the beginning of a cycle, the current in the primary coil is zero (0) and the main switch 710 is then turned on. The current in the primary coil increases linearly until a predetermined value Ipp is reached, upon which the switch 710 is opened. The energy stored in the primary coil is then transferred to the secondary coil, in which the current instantaneously raises to Ipp/n, where n is the secondary primary turn ratio for the transformer. The voltage on the primary switch increases to Vin+Vout/n. The current in the secondary drops linearly to zero with a slope of Vout/Ls, when the output diode (232 in FIG. 2) turns off and the cycle can be started again. A cycle duration is from 2 to 50 μs in most applications.

When operating a quasi-resonant flyback mode, the inverter utilizes the parasitic capacitance of the main switch 710 or, in the depicted embodiment, an added capacitance (e.g. capacitor 716) to absorb the leakage inductance energy. Thus, the QR bit is set to turn on the switch 718 and place the additional capacitor across the main switch 710. Also, by adequately choosing the turn-on time of the switch 710, it is possible to have a zero voltage turn-on characteristic as well as turn-off. This is performed to the benefit of the overall efficiency. One of the issues with this approach is that true zero voltage cannot be achieved for all operating conditions. For instance, the secondary reflected voltage (Vout/n) must be higher than the input voltage to have a zero voltage turn-on.

In an interleaved mode, two or more individual power stages (either operating in flyback or quasi-resonant flyback) can be combined to operate at the same frequency at each cycle while phase interleaved. In this manner, very high current can be handled by the inverter. The main power stage is used most of the time, while an Auxiliary power stage may be used when required, i.e., when the IL bit is set. The auxiliary power stage is operated with a delay. If two power stages are used, then the delay is ½ of an AC cycle, if 3 power stages are used, then the delay is ⅓ of an AC cycle and so one for N stages. Such an inverter may have many advantages, including reduction in the size of the parts used in the power path; a current rating in each power stage halved compared to a single power stage approach; and a reduction in EMI/RFI generation.

The foregoing approach is used to dynamically change the topology of the inverter from regular flyback to interleaved flyback to interleaved quasi-resonant based on the required output voltage and current. At lower voltage and current outputs, the current in the primary is such that a little amount of energy is lost in the leakage inductance at turn-off and discharge of the parasitic capacitance at turn-on. At medium output currents, it is possible to interleave two power stages in order to reduce "root mean square" currents in the input and output filters, and therefore the output noise. When the output voltage is sufficiently large, the system is switched into quasi-resonant mode in order to improve the overall efficiency.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. Apparatus for converting Direct Current (DC) to Alternating Current (AC), comprising:
    a conversion circuit for receiving the DC and converting the DC to the AC using at least one flyback mode of a plurality of flyback modes of operation of a flyback converter, wherein the plurality of flyback modes comprises at least two of regular flyback, interleaved flyback, and quasi-resonant flyback; and a controller, coupled to the conversion circuit, for generating control signals to select the at least one flyback mode from the plurality of flyback modes of operation.

2. The apparatus of claim 1 wherein the controller comprises:

a memory for storing data representing the control signals; and a sequencer for sequentially selecting the data from the memory to produce the control signals.

3. The apparatus of claim 1, wherein the conversion circuit comprises a sampling circuit for sampling at least one of a DC current, a DC voltage, and an AC line voltage and coupling at least one sample to the controller.

4. The apparatus of claim 3 wherein the controller selects the at least one flyback mode in response to the at least one sample.

5. The apparatus of claim 1, wherein the controller selects the at least one flyback mode to produce effective maximum power point tracking.

6. The apparatus of claim 1, wherein the controller selects the interleaved flyback mode as a result of a power requirement exceeding a power threshold.

7. The apparatus of claim 1 wherein flyback mode selection dynamically occurs during an AC line voltage cycle.

8. The apparatus of claim 1 wherein the conversion circuit is phase locked to an AC power grid voltage.

9. The apparatus of claim 1 wherein the conversion circuit comprises an input circuit, at least one power stage and an output circuit.

10. A method for converting direct current (DC) to alternating current (AC), comprising:

monitoring at least one of an input signal and output signal of a conversion circuit;

selecting, in response to monitored signals from the monitoring step, at least one flyback mode from a plurality of flyback modes for operation of a flyback converter, wherein the plurality of flyback modes comprises at least two of regular flyback, interleaved flyback and quasi-resonant flyback; and converting the DC to the AC utilizing the conversion circuit operating in the at least one flyback mode.

11. The method of claim 10 wherein the monitored signals comprise at least one of a DC voltage, a DC current, and an AC voltage.

12. The method of claim 11 wherein the selecting is based upon a state of the DC voltage and the DC current.

13. The method of claim 10 wherein the interleaved flyback is selected when a power requirement for the conversion circuit exceeds a predefined power threshold.

14. The method of claim 10 wherein the monitored signals form an address for accessing data representing control signals for selecting the at least one flyback mode.

15. Apparatus for generating solar power comprising:

at least one solar panel for producing direct current (DC) from sunlight;

a micro-inverter coupled to each of the at least one solar panels for converting the DC into alternating current (AC) using at least one selected flyback mode that is selected from a plurality of flyback modes of operation of a flyback converter;

an electric panel, coupled to the micro-inverter, for controlling distribution of the AC;

an electric meter, coupled to the electric panel, for measuring an amount of the AC that is coupled to a power grid.

16. The apparatus of claim 15 wherein the plurality of flyback modes comprises at least two of a regular flyback mode, an interleaved flyback mode, and quasi-resonant flyback mode.

17. The apparatus of claim 16 wherein the interleaved flyback mode utilizes at least two power stages within the micro-inverter.

18. The apparatus of claim 15 wherein the micro-inverter comprises a conversion circuit and a controller, where the controller controls a mode of operation of the conversion circuit.

* * * * *